United States Patent [19]

Fairchild

[11] 3,900,292

[45] Aug. 19, 1975

[54] AUTOMATIC CONTROL OF CRYSTAL SIZE DISTRIBUTION

[75] Inventor: James Logan Fairchild, Trona, Calif.

[73] Assignee: Kerr-McGee Chemical Corporation, Oklahoma City, Okla.

[22] Filed: Dec. 11, 1972

[21] Appl. No.: 313,852

Related U.S. Application Data

[63] Continuation of Ser. No. 96,179, Dec. 8, 1970, abandoned.

[52] U.S. Cl. .................................. 23/273 R; 23/301
[51] Int. Cl. .............................................. B01d 9/00
[58] Field of Search ............... 23/273 R, 301 R, 302

[56] References Cited
UNITED STATES PATENTS

| | | | |
|---|---|---|---|
| 1,976,936 | 10/1934 | Harms | 23/273 R |
| 3,361,540 | 1/1968 | Peverly et al. | 23/302 |
| 3,419,899 | 12/1968 | Tufts et al. | 23/302 |
| 3,425,795 | 2/1969 | Howard et al. | 23/302 |

*Primary Examiner*—Norman Yudkoff
*Assistant Examiner*—D. Sanders
*Attorney, Agent, or Firm*—William G. Addison

[57] ABSTRACT

An improved process for continuously producing crystals having a size distribution within a predetermined range. The rate at which seed crystals are withdrawn from a crystallizer and destroyed or wasted is controlled such that a fixed ratio is maintained between the rate at which the seed crystals are withdrawn and the rate at which a product slurry is withdrawn from the crystallizer and fed to a product classifier whereby the crystals obtained from the slurry discharge from the product classifier have a controlled narrow size distribution which would not have otherwise been obtainable.

4 Claims, 1 Drawing Figure

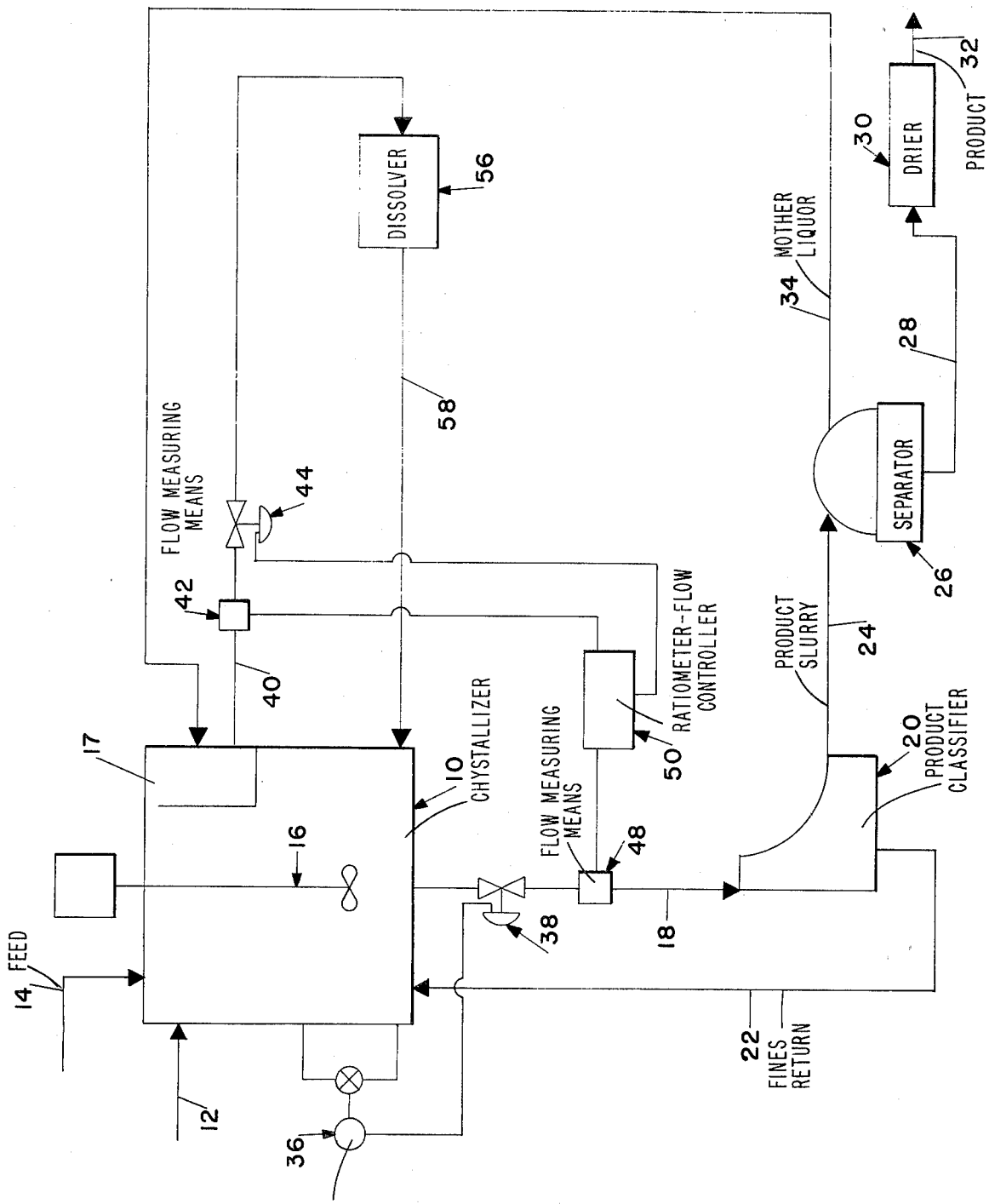

AUTOMATIC CONTROL OF CRYSTAL SIZE DISTRIBUTION

This is a continuation of application, Ser. No. 96,179 filed Dec. 8, 1970 and now abandoned.

BACKGROUND OF THE INVENTION

In continuous processes for producing crystals, one of the major problems has been controlling the crystal size and crystal size distribution. One of the simplest methods for producing crystals continuously from salts utilizes an apparatus referred to as a "back-mixed crystallizer". Utilizing such an apparatus, the crystallizing material is maintained in a homogenous suspension in a well-stirred tank. The slurry is continuously removed directly from the tank for recovery of the crystals. Such methods produce crystals having a broad size distribution which is largely uncontrolled.

Another method of continuously producing crystals utilizes a back-mixed crystallizer in combination with a product classifier. This method is frequently referred to as selective product removal. In such a method, a slurry containing crystals is continuously withdrawn from the crystallizer and passed to a product classifier. A portion of that slurry containing small crystals is returned to the crystallizer. The other portion of the slurry containing large (product) crystals is then collected for recovery of the crystals. Such a method has the effect of shortening the time that larger crystals are subjected to growth and thus reduces the size to which larger crystals can grow. In effect, selective product removal withdraws crystals from the crystallizer as soon as they have grown large enough to be product and before they grow too large to acceptable product. Therefore, selective product removal is a method to minimize growth beyond the classification size. However, such a method does not provide an effective means for controlling product crystals within a desired predetermined size distribution.

A further method of continuously producing crystals utilizes a back-mixed crystallizer and a device for continuously separating a slurry from the crystallizer, containing predominantly seed crystals which are subsequently destroyed by dissolution and returned to the crystallizer or simply disposed of as waste. This method is frequently referred to as fines destruction or fines removal. In such a method a slurry containing crystals is continuously withdrawn from the crystallizer and passed to a fines classifier. A portion of that slurry containing predominantly large crystals is returned to the crystallizer. The other portion of the slurry containing fines or seed crystals is processed to remove them from crystallizer system either through destruction or waste. Such a method has the effect of reducing the number of crystals upon which material can accumulate. This, in turn, has the effect of making the average crystal larger in size. Thus, fines removal is a method for making the product size distribution coarser, that is more of the product being produced as larger crystals. However, such a method does not provide an effective means for producing crystals having a predetermined size distribution.

Nearly all crystallization systems known use either selective or classified products removal, fines destruction, or a combination thereof.

SUMMARY OF THE INVENTION

A process has now been discovered for continuously producing crystals having a desired predetermined size and size distribution. A slurry comprising a mother liquor, crystallizable material and crystals of that material is continuously maintained in a crystallizing vessel through continuous feed of crystallizable material and continuous discharge of crystals and mother liquor. A first slurry containing fines or seed crystals is withdrawn from the crystallizing process, the seed crystals obtained within the slurry are wasted or dissolved and the resulting liquor returned to the crystallizing vessel. A second slurry is withdrawn from the main agitated portion of the vessel and passed to a product classifier. A portion of the second slurry containing small crystals is returned from the product classifier to the crystallizing vessel. The balance of the second slurry containing predominantly large crystals is removed for recovery of the crystals. It has now been found that it is possible to continuously control crystals to be within a narrower size distribution, than was heretofore possible, by maintaining a fixed ratio of the first slurry containing seed to be destroyed to the second slurry being fed to a product classifier.

BRIEF DESCRIPTION OF THE DRAWING

The drawing shows diagrammatically a typical process for preparing crystals such as sodium carbonate monohydrate. The process is shown utilizing a preferred embodiment of the instant invention.

DESCRIPTION OF A PREFERRED EMBODIMENT

The present invention relates to a process for continuously obtaining an improved size distribution of crystals. More particularly, the present invention relates to an improved process wherein a slurry comprising a mother liquor, a crystallizable material and crystals of said material are maintained within a crystallizing zone. A slurry is withdrawn from a well-mixed portion of the crystallizing zone and passed to a product or crystal classifier. A portion of that slurry containing predominantly small crystals is returned to the crystallizing zone. The remainder of the slurry is processed for recovery of the product crystals.

As a general rule, crystal size is principally a function of the number of crystals present in the crystallizer and of the total mass being crystallized. If the crystal mass has relatively few crystals, the crystals obtained will be relatively large or coarse. If there are a great number of crystals, the crystals obtained will be small or fines. More specifically, the size that a crystal within the crystallizer can obtain depends both upon the cumulative probability that the crystal will be removed from the crystallizer system and how fast crystals are growing (increasing in size) in the suspension. To insure that the right size distribution will be obtained, this probability has to be adjusted as a function of size and this balanced for a specific growth rate at a given production rate. Further, the number of crystals and their size will determine the density of the slurry within the crystallizer. The term "slurry density" as used herein refers to the ratio of the weight of solids to total slurry weight expressed as a weight percent.

The processes contemplated by the present invention are those that employ some density sensing means for monitoring slurry density within the crystallizer vessel and in which the slurry density is principally controlled by increasing or decreasing the rate at which slurry is withdrawn from the crystallizer and fed to the product classifier. In such a system, assuming a predetermined desired production rate, a slurry density within the crystallizer which is higher than the controlled level will cause an increase in the rate at which slurry is fed to the product classifier. Assuming normal operation of the crystallizer including normal product classifier feed rates prior to and during the period when the slurry density was increasing, the only manner whereby the slurry density could increase is a reduced rate for withdrawing crystals from the crystallizer system. With a normal product classifier feed rate the only manner whereby fewer crystals can be removed from the product classifier is to have fewer crystals large enough to be selectively removed by the product classifier. This then leads to the conclusion that with fewer large crystals and an increase in the total mass of crystals, there must have been an increase in the number of small crystals. That is to say, the cause of an increase in slurry density at constant production rate is a shift of the entire crystal size distribution toward smaller crystals. Conversely, if the slurry density decreases during normal steady operations of the crystallizer, causing decreases in the rate at which the product classifier is fed, the cause is a shift of the entire crystal size distribution toward larger crystals. In normal crystallization systems, one of the effects of increased production rates is an increase in the rate at which crystals are growing (increasing in size). One consequence of this increased growth rate is the tendency for more of the seed crystals to achieve a size larger than the classification size of the seed crystal classifier, with the result that fewer seed crystals will be separated by the seed crystal classifier for destruction or wasting. With fewer seed crystals being removed from the system, there is a tendency for the crystal size distribution to shift toward smaller sizes. A second effect of increased production rate is the need to remove mass more rapidly from the crystallizer. This occurs through an increase in the rate at which slurry is withdrawn from the crystallizer and fed to the product classifier. Thus, it becomes apparent that in such a system the rate at which product slurry is withdrawn from the crystallizer will vary considerably in maintaining a substantially constant slurry density within the crystallizer.

It has now been discovered that by withdrawing a slurry from a quiescent portion of the crystallizer containing predominantly small seed crystals, at a rate proportional to the rate at which the slurry is withdrawn from the crystallizer and fed to the product classifier, that product crystals may be continuously produced and controlled to be within a narrower size distribution than would otherwise have been possible. Thus, when the product classifier is fed at a higher rate indicating either an increased amount of fines in the crystallizer or a higher production rate, this indicates the need to also process more slurry from the seed crystal classifier to remove and dissolve or waste seed crystals at an increased rate. Conversely, when the feed to the product classifier is at a relatively low rate indicating predominantly large crystals in the crystallizer or a low product rate, then a relatively small quantity of slurry from the seed crystal classifier need be withdrawn for the removal of seed crystal. Therefore, it may be seen that the rate at which the product classifier is fed is directly proportional to the rate at which seed crystals should be withdrawn for maintenance of the desired narrow size distribution of product crystals.

The optimum ratio to be maintained between the rate at which product slurry is withdrawn and the rate at which seed crystals are withdrawn will be a function of many variables. As those skilled in the art will appreciate, such optimum ratio will depend upon crystallization system parameters such as slurry density, nucleation rate, growth rate, temperature, the material to be crystallized and the like, as well as upon equipment parameters such as classification characteristics of the seed crystal classifier, mean retention times of crystals, classification characteristics of the product classifier and extraneous fines generation or removal such as can occur by dilutions, heating, or cooling. Because of the several system and equipment parameters and extraneous fines generation and or removal, the optimum ratio cannot be predicted apriori for a particular installation.

However, the ratio may be determined, for a specific crystallization system and installation, empirically, that is to say, through trial and error or experimentation. For example, the system may be operated while maintaining different ratios for a discrete test period and analyzing the size and size distribution of the crystals thus obtained during each test period. Thus, the optimum ratio for that installation and product is determined.

The specific manner in which the ratios are measured and maintained is not particularly significant. It is preferred, of course, that the method employed be able to maintain this ratio within relatively close limits and desirably the system should use automatic instruments and be such that the ratio may be easily altered if desired. One example of such a system is shown in the drawing. However, as those skilled in the art will appreciate, there are many equivalents that could be substituted. For instance, the flow measuring means can well be any style for example, venturi tube, calibrated orifice and magnetic or the like. The important thing is that the method employed be such that it will maintain a relatively constant predetermined ratio between the respective flow rates. The specific equipment whereby coarse and fine crystals are largely separated from each other, that is classified, is also not particularly significant. It is preferred, of course, that the equipment employed be able to make a good separation based upon crystal size. One example of such equipment is shown in the drawing where a slurry containing only fines for dissolving or wasting is obtained by using a baffled, quiescent zone which allows coarse crystals of higher settling rates to settle out and return to the main agitated portion of the crystallizer while small seed crystals which have low settling rates are swept out with the liquor. Examples of other classifiers which would be suitable are cyclones, screens, and settlers which may or may not be elutriated and which may or may not be external to the crystallizer body, but which are external to the agitated crystallizing zone of the crystallizer body.

Referring now to the drawing, a diagram of a process designed specifically for causing anhydrous sodium carbonate to continuously convert to sodium carbonate monohydrate crystals, a feed stream of anhydrous soda ash is continuously introduced through line 14 into crystallizer 10 at a rate which determines the production rate of the crystallizer. Crystallizer 10 has therein an agitator means 16. The product classifier 20 is fed by line 18 which withdraws slurry from the agitated portion of the crystallizer. The product classifier divides the slurry into two portions, one portion containing predominantly smaller crystals is returned through line 22 to crystallizer 10. The remaining portion containing predominantly crystals which are large enough to be acceptable product is passed through line 24 to crystal separator means 26. The product crystals separated, substantially free of the mother liquor, are passed through line 28 to drier 30 and the dried product crystals recovered from line 32. The mother liquor, substantially free of product crystals, is carried away by line 34 from crystal separator means 26 to crystallizer 10.

The specified slurry density within crystallizer 10 is maintained by controlling the rate at which slurry is fed to product classifier 20 through line 18 with density sensor and controller 36 operating to open or close control valve 38, which is in line 18, as necessary. A slurry containing predominantly small seed crystals is withdrawn from a baffled, quiescent zone 17 which may be internal or external of crystallizer 10 through line 40 and passed to dissolver 56 where the seed crystals are caused to be largely dissolved. The discharge stream from dissolver 56, having had the seed crystals dissolved, is returned to crystallizer 10 through line 58. It has now been found that if the slurry containing predominantly seed crystals is removed from the quiescent zone of crystallizer 10 at a rate directly proportional to the rate at which product classifier 20 is fed, then product crystals can be controlled to be predominantly and consistently within a prescribed range of sizes. Accordingly, flow measuring means 48 is installed in line 18 to continuously monitor the rate at which product classifier 20 is fed and a signal proportionate to that flow rate is transmitted to ratiometer-flow controller 50. Flow measuring means 42 continuously monitors the rate at which the slurry, predominantly containing fines, is withdrawn and a signal proportional thereto is transmitted to ratiometerflow controller 50. Ratiometer-flow controller 50, in turn, regulates flow control valve 44 to increase or decrease the flow rate in line 40 such that a predetermined ratio between the respective flow rates is maintained.

The following example is set forth not to limit, but to more clearly illustrate the invention.

EXAMPLE

The following example illustrates a typical application of the instant invention. The crystallizer utilized was a commercial crystallizer of the draft tube, baffled type. Agitation was supplied by a marine-type propeller, internal to the draft tube, which was turned to cause an upward flow inside the draft tube. The flow within the draft tube was such that the entire volume of slurry in the crystallizer was pumped through the draft tube twice each minute. The baffle was a concentric shell around the outside of the main crystallizer body which provided a quiescent zone for producing a slurry containing predominantly fines. An external heat exchanger was used to control the temperature of the crystallizer.

Recycle mother liquor, nearly saturated with sodium carbonate, was introduced into the crystallizer at the rate necessary to maintain a volume of 7,700 gallons within the crystallizer. This rate averaged approximately 25 gpm. Soda ash was introduced into the crystallizer at a temperature of 500°F. A slurry density was maintained within the crystallizer of from about 29 to 31 weight percent. The slurry within the crystallizer, consisting essentially of a mother liquor, sodium carbonate monohydrate and crystals thereof, was maintained at a temperature of 180°F.

The crystallizer was equipped with water purged bubble tubes at two levels in the crystallizer with the tubes one to one side and the other to the other side of a differential pressure cell (d/p cell). The differential pressure as measured by the d/p cell is proportional to the slurry density and the output of the d/p cell is the signal input to a standard penumatic controller for the slurry density.

A product slurry was withdrawn from the main mixed portion of the crystallizer through a flow control valve and passed to a product classifier. The product classifier used was a wet screen of the dam-rapifine type. The screen was 2 feet wide, 45°, and had wedge bar filter surface with 0.50 millimeter openings. The product slurry was fed on to the top of the screen and the liquor and fine crystals washed through the screen and back to the crystallizer.

The remaining portion containing predominantly large crystals having an average mesh size greater than 60 mesh, was passed to a crystal separator means. The crystal separator means utilized was a rotary drum vacuum filter. However, as those skilled in the art will appreciate, there are numerous other applicable methods such as a centrifuge, flat-bed filter and the like.

The product crystals were withdrawn from the crystal separator and passed to a direct fired rotary drier where they were dried.

The mother liquor substantially free of product crystals was recovered from the crystal separator and returned to the crystallizer as necessary to control crystallizer slurry level. A second slurry, containing predominantly small seed crystals, was withdrawn from the baffled quiescent portion of the crystallizer vessel. This second slurry having come from a seed crystal classifier, contained crystals predominantly smaller than 200 mesh. This second slurry containing crystals predominantly smaller than 200 mesh was passed to a seed crystal dissolver wherein the slurry was diluted with water to dissolve the crystals. Slurry to feed the product classifier was withdrawn from the crystallizer at a nominal rate of 100 gallons per minute. The density sensor regulated the classifier feed flow control valve to vary the rate at which product classifier feed slurry was withdrawn from the crystallizer within the limits of 70 to 140 gallons per minute so as to maintain a relatively constant slurry density in the crystallizer within the range of 29 to 31 weight percent. The rate at which slurry was being fed to the product classifier was monitored by a flow meter and a signal proportional thereto transmitted to a ratiometer-flow controller. The ratiometer-flow controller in turn regulated a seed crystal flow control valve to provide a fixed ratio between the rate at which slurry was withdrawn and fed to the product classifier and the rate at which the second slurry containing seed crystals was withdrawn. For this particular system, the optimum ratio of seed crystal withdrawal rate to product classifier feed rate was found to be 0.20. Under normal steady operation, the product crystal size distribution was found to be as shown in the table below.

|  | Extreme Range of Screen Analyses with Control | Average Screen Analysis With Control |
|---|---|---|
| Plus 20 mesh | 0 | 0 |
| Plus 40 mesh | 15.0% | 8.3% |
| Plus 100 mesh | 92.0% | 95.8% |

Thus, it may be seen that utilizing the process of the instant invention, crystals having a size distribution, within a narrower range than was heretofore possible, may be produced.

What is claimed is:

1. In a process for continuously producing crystals which comprises establishing in a crystallizing zone a slurry of (1) a mother liquor, (2) crystallizable material and (3) crystals of said crystallizable materials, monitoring the slurry density in the crystallizing zone using a slurry density sensing means and controlling the slurry density by increasing or decreasing the rate at which a first slurry is withdrawn from a well-mixed portion of said crystallizing zone and classified by size into two slurries, one of which contains small crystals which is returned to the crystallizing zone and the other of which contains predominantly large crystals, recovering as product said large crystals from said other slurry and returning the remaining mother liquor therefrom to the crystallizing zone, measuring the rate at which said first slurry is withdrawn from the crystallization zone while withdrawing a seed slurry containing predominantly seed crystals from a baffled, quiescent zone within the crystallizing zone which quiescent zone separates said crystals by a settling method, treating said seed slurry to render it seed-free and returning the seed-free slurry to said crystallization zone: the improvement which comprises producing said product crystals within a prescribed, desired size distribution by maintaining a fixed predetermined ratio of withdrawal rates between said first slurry and said seed slurry.

2. The process of claim 1 wherein said seed slurry which is obtained from a baffled, quiescent zone internal the crystallizing zone contains crystals which are predominantly smaller than 100 mesh.

3. The process of claim 1 wherein the seed crystals in said seed slurry are destroyed by dissolution and the slurry is returned to the crystallizer.

4. The process of claim 1 wherein said crystallizable material is sodium carbonate monohydrate.

* * * * *